Feb. 5, 1924.  
C. H. WILLS  
FAN FOR HYDROCARBON MOTORS  
Original Filed Nov. 12, 1920
1,482,498
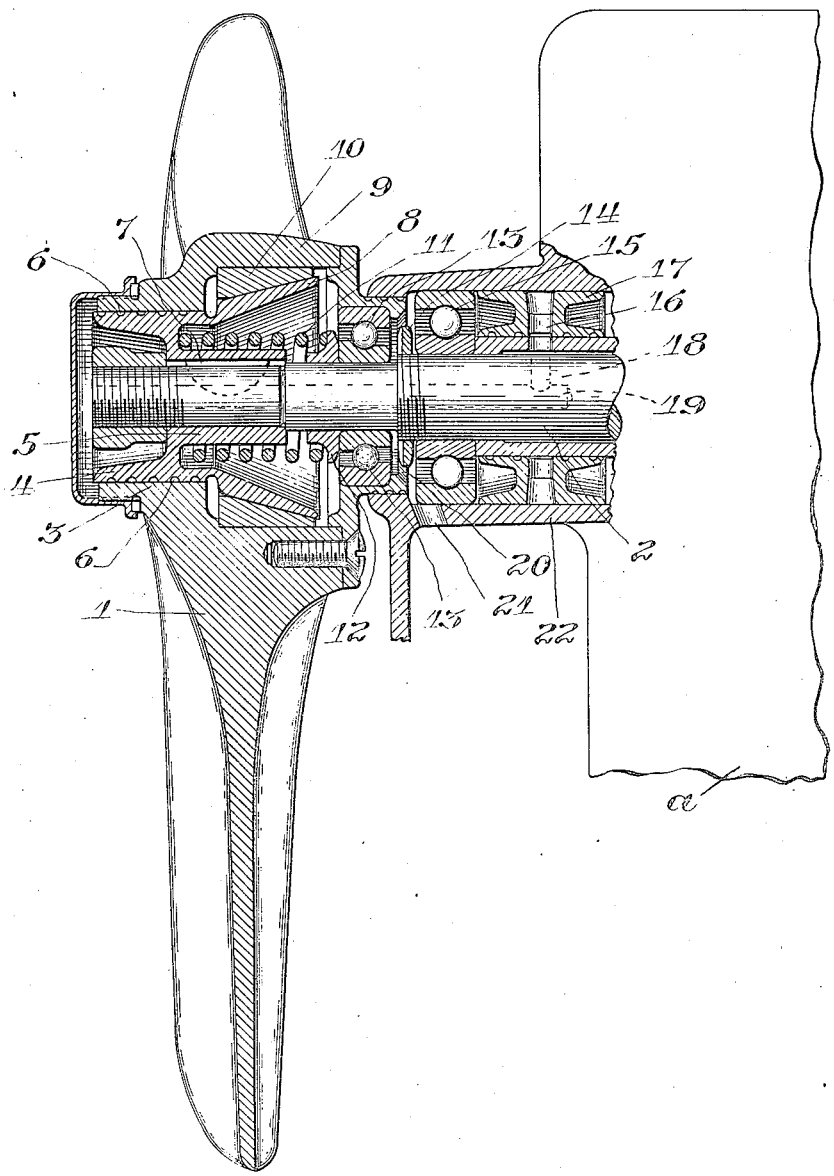

Patented Feb. 5, 1924.

1,482,498

UNITED STATES PATENT OFFICE.

CHILDE HAROLD WILLS, OF MARYSVILLE, MICHIGAN.

FAN FOR HYDROCARBON MOTORS.

Application filed November 12, 1920, Serial No. 423,684. Renewed September 20, 1923.

*To all whom it may concern:*

Be it known that I, CHILDE HAROLD WILLS, a citizen of the United States, residing at Marysville, in the county of St. Clair and State of Michigan, have invented certain new and useful Improvements in Fans for Hydrocarbon Motors, of which the following is a specification.

This invention relates to hydrocarbon motors, and particularly to the fan for such motors.

The principal object of the invention is to save power in driving the fan. This object is accomplished by automatically decreasing the effective driving tongue delivered to the fan from its driving mechanism when the latter obtains a predetermined high speed. Particularly, it is an object of the invention to obtain the above result by means of a slipping clutch, the decreasing frictional pull or disengagement of which is effected conjointly by the overloading of the clutch and by the outward thrust of the fan, the latter effect serving to give a definite time of separation of the clutch members.

Another object is to provide for the efficient lubrication of the clutch.

With these objects in view, the invention is embodied in preferable form in the construction and arrangement hereinafter described and illustrated in the accompanying drawing, in which drawing the view shown is a central vertical section through the fan, part of its driving mechanism and the slipping clutch disposed between the driving mechanism and the fan.

Referring to the drawings, *a* is part of a hydrocarbon motor and 1 indicates the fan of the hydrocarbon motor which is freely mounted on a shaft 2 which may be driven from the crank shaft through intermediate gearing in any suitable manner. The outer part 3 of the hub of the fan is mounted freely upon an annular bearing flange 4 of a longitudinally slidable sleeve 5. The flange 4 is provided with circumferential surface oil grooves 6. The sleeve 5 is keyed at 7 to the shaft 2. This sleeve is provided with a conical extension 8 spaced from that part of the sleeve surrounding the shaft and constituting a male clutch member. Between this conical section and a recessed rear flange 9 of the fan hub is mounted a conical bushing 10, preferably of bronze or equivalent material, for the purposes herein described, and which member is secured to the fan hub and constitutes the other element of a cone clutch. Mounted in the space between the bearing portion of the sleeve 5 and the conical extension 8 is a spring 11, the forward end of which bears against the sleeve and tends to press the clutch member 8 into engagement with the clutch member 10, and the rear end of which bears against the retaining ring 12, which in turn bears against an angular ball thrust and radial pressure bearing 13. The bearing 13 takes the thrust of the spring at low speeds and at high speeds acts as a radial pressure bearing, holding the fan concentric with the shaft. An adjusting spacing ring 14 is mounted between this bearing 13 and another radial pressure ball bearing 15. An oil admitting opening 16 is formed in a bearing retaining sleeve 17, and from this opening a passageway 18 leads to a channel 19 extending through the shaft longitudinally thereof, and through the front end thereof so as to convey the oil which is under pressure to the front part of the clutch chamber. The oil is thus caused to travel back from the front end of the clutch to the bearing surfaces of the fan hub and sleeve flange, and thence between the two clutch members. The oil then passes from the space to the rear of the clutch members to the bearings 13 and 15, reaching the latter through the passageway 20. It passes from these bearings by way of an opening 21 formed in a casing 22 back to the crank chamber.

In the operation of the device, when the motor and the shaft 2 are running at any speed below a predetermined rate the clutch member 8 will be forced into engagement with the other conical clutch member 10 with sufficient force to grip the two members together, and thus drive the fan at the speed of the shaft, the angular bearing 13 acting as a thrust bearing to take the thrust of the spring. When the engine and the shaft reach a predetermined high speed the overload thus produced on the clutch members will tend to cause them to slip one upon the other, and to this effect is conjoined the outward thrust of the fan at high speeds which causes the members to move relatively longitudinally. As a result of these two forces the sleeve 5 will be forced inwardly against the spring relatively to the hub of the fan, and the clutch members will slip upon one another, thus reducing the force of the frictional engagement between the clutch members and permitting the shaft to overrun the fan. The cone formation of the clutch is the element that enables this slipping action to be obtained partly by the thrust of the fan, thus effecting the separation of the clutch members at a definite time. When the speed of the shaft decreases the clutch members are again forced more tightly into engagement, and the speed of the fan thereby synchronized with the speed of the shaft.

Since the oil feed to the two sets of bearings is controlled by the extent of opening between the clutch members, the feed of oil to such bearings will be automatically increased as the shaft speeds up owing to the separation of the members one from the other, thus enlarging the oil passage.

Having thus described my invention, what I claim is:

1. In a hydrocarbon motor, a fan, driving mechanism therefor, and connecting mechanism between the driving mechanism and said fan yieldable under end thrust of the fan.

2. In a hydrocarbon motor, a fan, driving mechanism therefor, and a clutch between said fan and driving mechanism yieldable to lessen the frictional engagement of said clutch under end thrust of the fan.

3. In a hydrocarbon motor, a fan, driving mechanism therefor, and a spring pressed clutch between said driving mechanism and fan separable under a predetermined load on the driving mechanism and the end thrust of the fan.

4. In a hydrocarbon motor, a driving shaft for said fan, a clutch between said shaft and fan, means forming a clutch chamber having oil receiving spaces in front of and to the rear of the clutch, and means for feeding oil through the shaft to the front space and causing it to traverse the clutch face surfaces back to the rear space.

5. In a hydrocarbon motor, a fan, a shaft therefor, bearings for said shaft, oil feed means for said bearings, a clutch having cone members connecting said shaft and fan and forming an oil passage between them leading to said bearings, and means for effecting the separation of the members as the speed of the shaft increases to thereby effect an increased feed of oil to said bearings.

6. In a hydrocarbon motor, a fan, a driving shaft therefor, a casing surrounding the shaft, a thrust bearing between the shaft and fan, another bearing between the shaft and casing, separable clutch means between the shaft and fan, an oil feeding passage leading to the clearance between the clutch members, means of oil communication from spaces around the clutch to said bearings, a common oil channel communicating with said two bearings, and said casing having an oil exit opening communicating with said channel.

7. In a hydrocarbon motor, a fan, a driving shaft for said fan, a casing surrounding the shaft, a clutch between said fan and shaft, a spring for said clutch, and an annular ball bearing between said casing and shaft taking the thrust of said fan.

Signed at Marysville, Michigan, this 19 day of October, 1920.

CHILDE HAROLD WILLS.